March 20, 1951 S. BREIMER 2,546,025
RADIO TRANSMITTER WITH HUM COMPENSATING MEANS
Filed Jan. 11, 1947
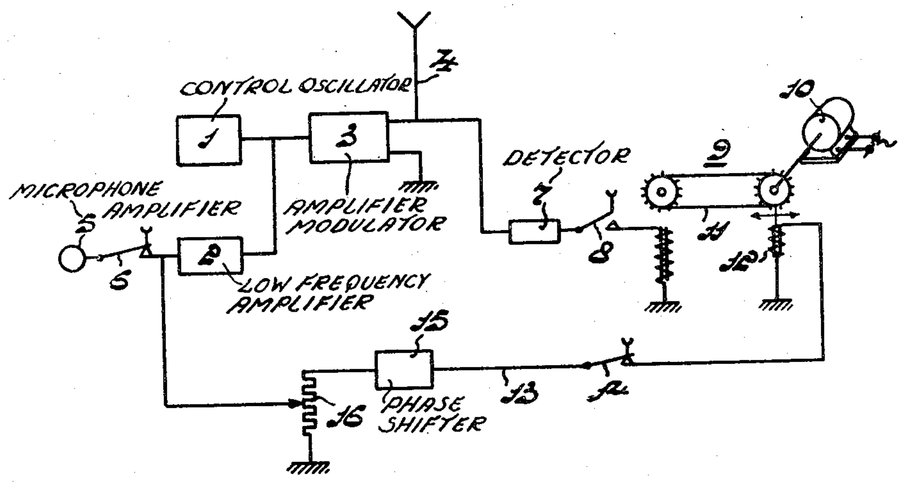
SYTSE BREIMER
INVENTOR
BY Fred M Vogel
AGENT Patented Mar. 20, 1951 2,546,025

UNITED STATES PATENT OFFICE 2,546,025

RADIO TRANSMITTER WITH HUM COMPENSATING MEANS

Sytse Breimer, Eindhoven, Netherlands, assignor to Hartford National Bank and Trust Company, Hartford, Conn., as trustee Application January 11, 1947, Serial No. 721,566
In the Netherlands November 9, 1945

Section 1, Public Law 690, August 8, 1946
Patent expires November 9, 1965

5 Claims. (Cl. 250—17)

This invention relates to a method for hum compensation in a system transmitting electrical oscillations and fed from power mains.

For this purpose it is known to make use of a negative feedback circuit bridging several stages in which the hum is initiated. This hum compensation method suffers from the disadvantage that not only the hum voltage to be compensated, but also the oscillations to be amplified, which may form part of a wide frequency range, are negatively fed back. Due to this the stability of the system decreases as the number of stages bridged is larger.

The invention has for its object to provide a method of hum compensation, by which exclusively the hum voltage to be compensated is negatively fed back.

The method according to the invention is based on the recognition that the hum modulated, for instance, on the carrier wave of a transmitter, is always a periodic phenomenon, the frequency of which corresponds to that of the power mains from which the transmitter is fed, or a harmonic thereof, the fundamental frequency and the harmonic frequencies exhibiting a definite amplitude and phase ratio. The hum image, modulated on the carrier wave, furthermore depends to a greater or less degree upon the adjustment of the transmitter, but in the case of a definite adjustment it is fairly constant. However, the frequency is dependent upon the mains frequency.

Based on this realisation, the invention achieves reduced hum in a system for the transmission of electrical oscillations, by recording the hum to be compensated in a system during operation thereof, but in the absence of the oscillations to be transmitted, and, in the presence of the oscillations to be transmitted, to derive from the recorded hum image a negative feedback voltage to be supplied to the system.

On making use of the system according to the invention in a transmitter, the recording takes place in the absence of modulation. Renewed recording preferably takes place every time upon putting the system into operation.

In order that the invention may be clearly understood and readily carried into effect it will now be more fully explained with reference to the accompanying drawing, given by way of example, in which a system for transmitting low frequency oscillations, which is suitable for carrying out the method according to the invention, is represented diagrammatically.

The drawing represents a transmitting system comprising a control oscillator 1, a low frequency amplifier 2, an amplifier modulator 3 and an aerial 4. The oscillations to be transmitted are taken from a microphone amplifier 5 and supplied to the low frequency amplifier 2 through a switch 6.

If the switch 6 is open and the transmitter operative, a hum-modulated carrier wave appears in the output circuit of the amplifier 3. This hum has a periodic character and its frequency corresponds to that of the supply means or to a harmonic thereof.

In order that this hum may be compensated, the output voltage of the amplifier 3 is supplied to a detector 7 and the hum voltage, appearing in the output circuit thereof, is supplied to a recording device 9 through a switch 8. This device comprises a synchronous motor 10 which is fed from the power mains of the transmitter and driven by means of an endless band 11 on which the hum voltage in the output circuit of the detector 7 is recorded. In conjunction with the periodic character of the hum voltage several periods of the hum voltage are fixed, thus obtaining a faithful image of the hum occurring with a given adjustment of the transmitter. Upon recording an adequate number of periods of the hum voltage the switch 8 is opened.

On putting the microphone amplifier 5 into operation, by closing the switch 6, the hum voltage appearing in the output circuit of the amplifier 3 is adapted to be compensated by supplying to the low frequency amplifier 2 a negative feed back voltage having the correct amplitude and phase, which voltage is taken from the recording device 9 by means of an abstraction device 12 associated therewith. The conductor 13, through which the negative feedback voltage is supplied to the low frequency amplifier 2, comprises a switch 14 which should be open on recording the hum image.

The amplitude- and phase ratios of the frequency components of the hum voltage in the output circuit of the transmitter and those of the voltage taken from the recording device not being exactly equal, due to the presence of the magnetic recording device 9, a filter 15 correcting the amplitude and phase distortion occurring in recording is preferably included in the lead 13.

In order that the hum appearing in the output circuit may be reduced to a minimum, a potentiometer 16 is provided, which regulates the amplitude of the total negative feedback voltage, and the collecting device 12 is movable with respect to the hum image recorded on the band, as a result of which the phase of the whole hum image is adapted to be given the correct ratio with respect to the phase of the hum voltage in the transmitter.

In the present form of construction the invention is used in a system for transmitting low frequency oscillations through the intermediary of a carrier wave. However, it may also be used in a low frequency transmitter.

What I claim is:

1. In combination with a radio transmitter energized by an alternating-current supply and adapted to generate a carrier wave, said wave having a hum modulation component arising from said supply, said transmitter including means to modulate said carrier wave with an intelligence signal, apparatus to compensate for said hum comprising a detector coupled to said transmitter for demodulating said carrier, means coupled to the output of said detector to record solely the detected hum modulation component for a predetermined period in the absence of signal modulation, means continuously to reproduce electrically said recording to develop a negative feedback voltage in accordance with the recorded hum component, and means to apply said negative feedback voltage to the modulation means of said transmitter to compensate for said hum.

2. An arrangement as set forth in claim 1, wherein said recording and reproducing means is defined by a continuous magnetic tape, a magnetic recording head adjacent one portion of said tape and coupled to said detector for recording the hum component on said head, a magnetic pick-up head adjacent another portion of said tape for electrically reproducing said hum component, said pick-up head being coupled to the input of the modulation means of said transmitter, and motive means for driving said tape at a uniform speed.

3. An arrangement as set forth in claim 2 further including a filter network interposed between said pick-up head and the input of said modulation means, said network being arranged to correct for phase and amplitude distortion in the recording.

4. An arrangement as set forth in claim 3 wherein the position of said pick-up head is movable along said tape.

5. An arrangement as set forth in claim 4 wherein said motive means includes a synchronous motor energized by said alternating-current supply.

SYTSE BREIMER.

REFERENCES CITED

The following references are of record in the file of this patent:

UNITED STATES PATENTS

| Number | Name | Date |
|---|---|---|
| Re. 17,360 | Gage | July 2, 1929 |
| 1,677,296 | Rosenbaum | July 17, 1928 |
| 1,990,502 | Salzberg | Feb. 12, 1935 |
| 2,032,253 | Bush | Feb. 25, 1936 |
| 2,250,613 | Wiegerinck et al. | July 29, 1941 |
| 2,410,424 | Brown | Nov. 5, 1946 |
| 2,455,052 | Fisher | Nov. 30, 1948 |